US012304375B2

(12) United States Patent
Jones et al.

(10) Patent No.: US 12,304,375 B2
(45) Date of Patent: May 20, 2025

(54) VEHICLE HAVING DEPLOYABLE TRAY FOR USE ON A STEERING WHEEL

(71) Applicant: Ford Global Technologies, LLC, Dearborn, MI (US)

(72) Inventors: Micah Jones, Oakland, MI (US); Rafael Rego, Bloomfield Hills, MI (US); Erik Chapman, Waterford Township, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 18/365,291

(22) Filed: Aug. 4, 2023

(65) Prior Publication Data
US 2025/0042319 A1 Feb. 6, 2025

(51) Int. Cl.
*B60N 3/00* (2006.01)
(52) U.S. Cl.
CPC .................................... *B60N 3/005* (2013.01)
(58) Field of Classification Search
CPC ......... B60N 3/005; B60N 3/001; B60N 3/002
USPC ...................................................... 108/44, 45
See application file for complete search history.

(56) References Cited

U.S. PATENT DOCUMENTS

| 4,796,791 A * | 1/1989 | Goss ........................ B60N 3/08 248/650 |
| 4,915,035 A | 4/1990 | Clark et al. |
| 5,413,035 A | 5/1995 | Fernandez |
| 6,036,158 A | 3/2000 | Raasch |
| 6,457,421 B1 | 10/2002 | Apichom |
| 6,494,148 B1 | 12/2002 | Mullaney |
| 8,079,312 B2 | 12/2011 | Long |
| 9,834,121 B2 * | 12/2017 | Riefe ........................ B62D 1/04 |
| 10,583,740 B2 * | 3/2020 | Ory ....................... B60K 35/658 |
| 11,377,009 B2 * | 7/2022 | Stuart ................. B60R 11/0241 |
| 2005/0218681 A1 * | 10/2005 | DePue ................... B60N 3/002 296/37.12 |
| 2006/0032410 A1 | 2/2006 | Miller |
| 2012/0018472 A1 * | 1/2012 | Totani ................. B60R 11/0252 224/276 |
| 2016/0325662 A1 | 11/2016 | Nash et al. |
| 2022/0134929 A1 | 5/2022 | Machuszek |
| 2023/0017079 A1 | 1/2023 | Avila |
| 2024/0083320 A1 * | 3/2024 | Martinez ................ B60N 3/001 |

(Continued)

FOREIGN PATENT DOCUMENTS

| CN | 201761403 U | 3/2011 |
| CN | 202368423 U | 8/2012 |
| CN | 106608212 B | 4/2020 |

(Continued)

OTHER PUBLICATIONS

EP4371819 translation (Year: 2025).*
DE 202023103941 translation (Year: 2025).*

*Primary Examiner* — Daniel J Rohrhoff
(74) *Attorney, Agent, or Firm* — Vichit Chea; Price Heneveld LLP

(57) ABSTRACT

A vehicle comprises a steering wheel assembly having a steering wheel, a console having a housing with a wall configured with a tray storage region, and a tray configured to be stored in the tray storage region in the console in the stowed position, where the tray is configured to be operatively coupled to the steering wheel in a deployed position.

17 Claims, 6 Drawing Sheets

(56) References Cited

U.S. PATENT DOCUMENTS

2024/0190821 A1* 6/2024 Greenlee .............. C07D 498/10
2024/0208386 A1* 6/2024 Harmon ................. B60N 3/001

FOREIGN PATENT DOCUMENTS

| DE | 102004011979 A1 * | 10/2005 | ............. B60N 3/005 |
| DE | 202023103941 U1 * | 8/2023 | ............. B60K 35/22 |
| EP | 1188609 B1 | 5/2006 | |
| EP | 4371819 A1 * | 5/2024 | ............. B60N 3/002 |
| GB | 2488801 A | 9/2012 | |

* cited by examiner

VEHICLE HAVING DEPLOYABLE TRAY FOR USE ON A STEERING WHEEL

FIELD OF THE DISCLOSURE

The present disclosure generally relates to motor vehicles, and more particularly relates to a deployable tray for use on a steering wheel on a vehicle when the vehicle is not operating.

BACKGROUND OF THE DISCLOSURE

Motor vehicles are commonly equipped with a cabin interior having a steering wheel and a seating arrangement. Some vehicles have fixed trays or work surfaces. It would be desirable to have a deployable tray that conveniently stows when not in use.

SUMMARY OF THE DISCLOSURE

According to a first aspect of the present disclosure, a vehicle comprises a steering wheel assembly having a steering wheel, a console having a housing with a wall configured with a tray storage region, and a tray configured to be stored in the tray storage region in the console in a stowed position, wherein the tray is configured to be operatively coupled to the steering wheel in a deployed position.

Embodiments of the first aspect of the present disclosure can include any one or a combination of the following features:
  the console further comprises a connector assembly for connecting the tray to the tray storage region in the deployed position;
  the connector assembly comprises a cam latch for latching the tray in a fixed position onto the tray storage region;
  the tray has a first edge that matingly engages with a second edge of the tray storage region;
  the first edge has a slot and the second edge has a rib that is matingly in the slot;
  the tray has angled first and second sides that fit within angled first and second sides of the tray storage region;
  the tray comprises an opening configured to receive a portion of the steering wheel;
  the opening has an oblong shape;
  the opening includes a bulge portion between ends of the slot, wherein the bulge portion allows the tray to engage a lower portion of the steering wheel;
  the tray forms a portion of a wall of the console in the stowed position;
  the console is a center console positioned between two seating assemblies; and
  the center console includes a first tray storage region and a second tray storage region on opposite walls, and wherein the vehicle includes a first tray configured to fit within the first tray storage region and a second tray configured to fit within the second tray storage region in the stowed position.

Embodiments of the second aspect of the present disclosure can include any one or a combination of the following features:
  According to a second aspect of the present invention, a method of providing a tray on a steering wheel in a motor vehicle comprises providing a console on the vehicle having a sidewall provided by a tray connected to a tray storage region, removing the tray from the tray storage region in the sidewall of the console, and placing the tray on a portion of the steering wheel such that a portion of the steering wheel extends through an opening formed in the tray.
  the step of inserting the tray on the steering wheel comprises inserting the tray on a lower portion of the steering wheel;
  the step of unlatching the tray from the tray storage region by rotating a cam latch to an unlatched position;
  the tray includes a first edge configured to matingly engage a second edge of the tray storage region;
  the first edge has a slot and the second edge has a rib that is matingly engageable in the slot;
  inserting the tray in a slot in a dashboard forward of a passenger seat in the vehicle; and
  the step of reinserting the tray in the tray storage region and fixedly latching the tray with the cam latch; and
  the console comprises a center console having first and second tray storage regions configured to receive first and second trays.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
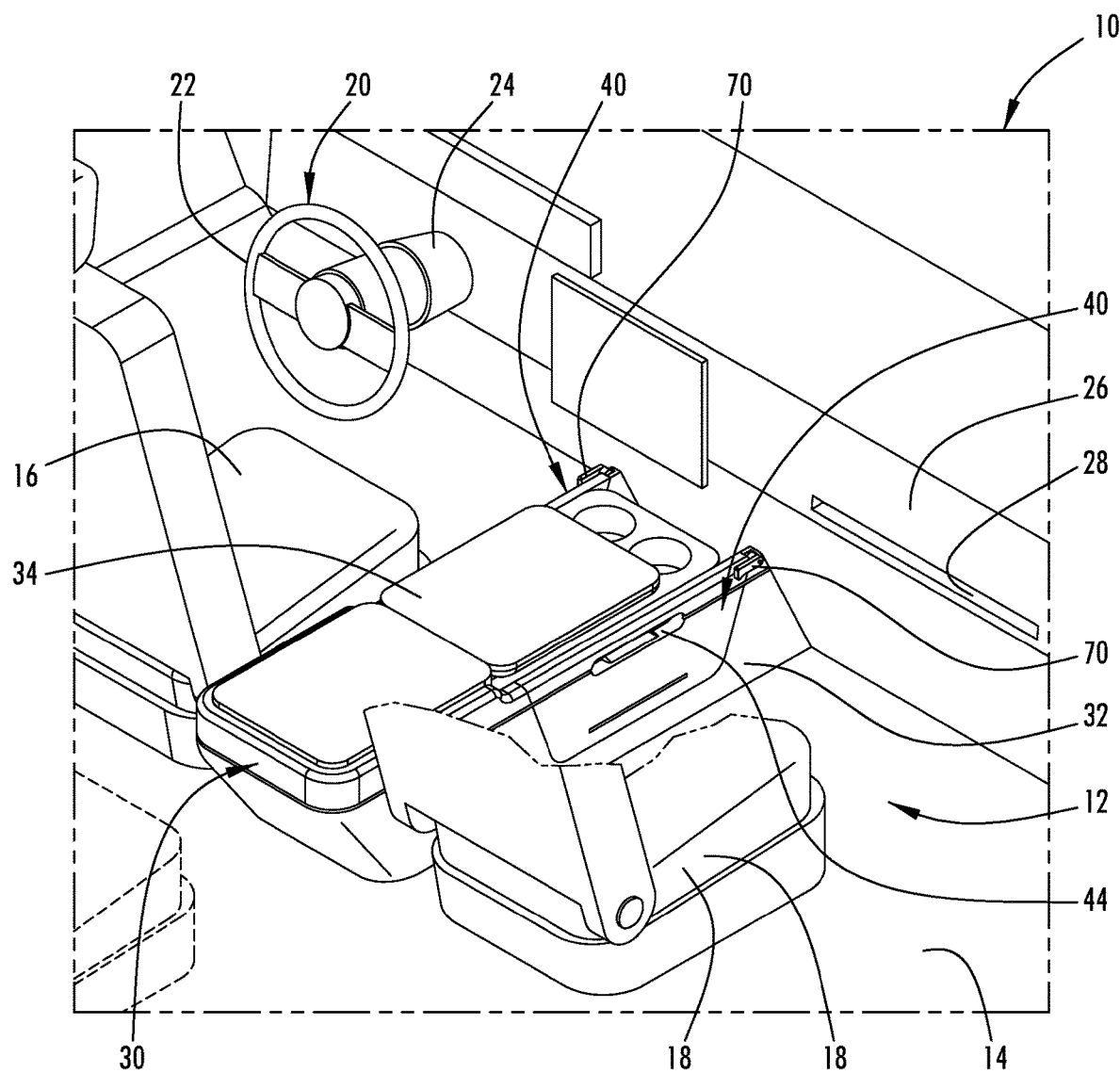
FIG. 1 is a rear perspective view of the cabin interior of a motor vehicle equipped with a pair of trays stowed on a center console in stowed positions, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design;

some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a tray that may be stored in a console and deployed on a steering wheel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
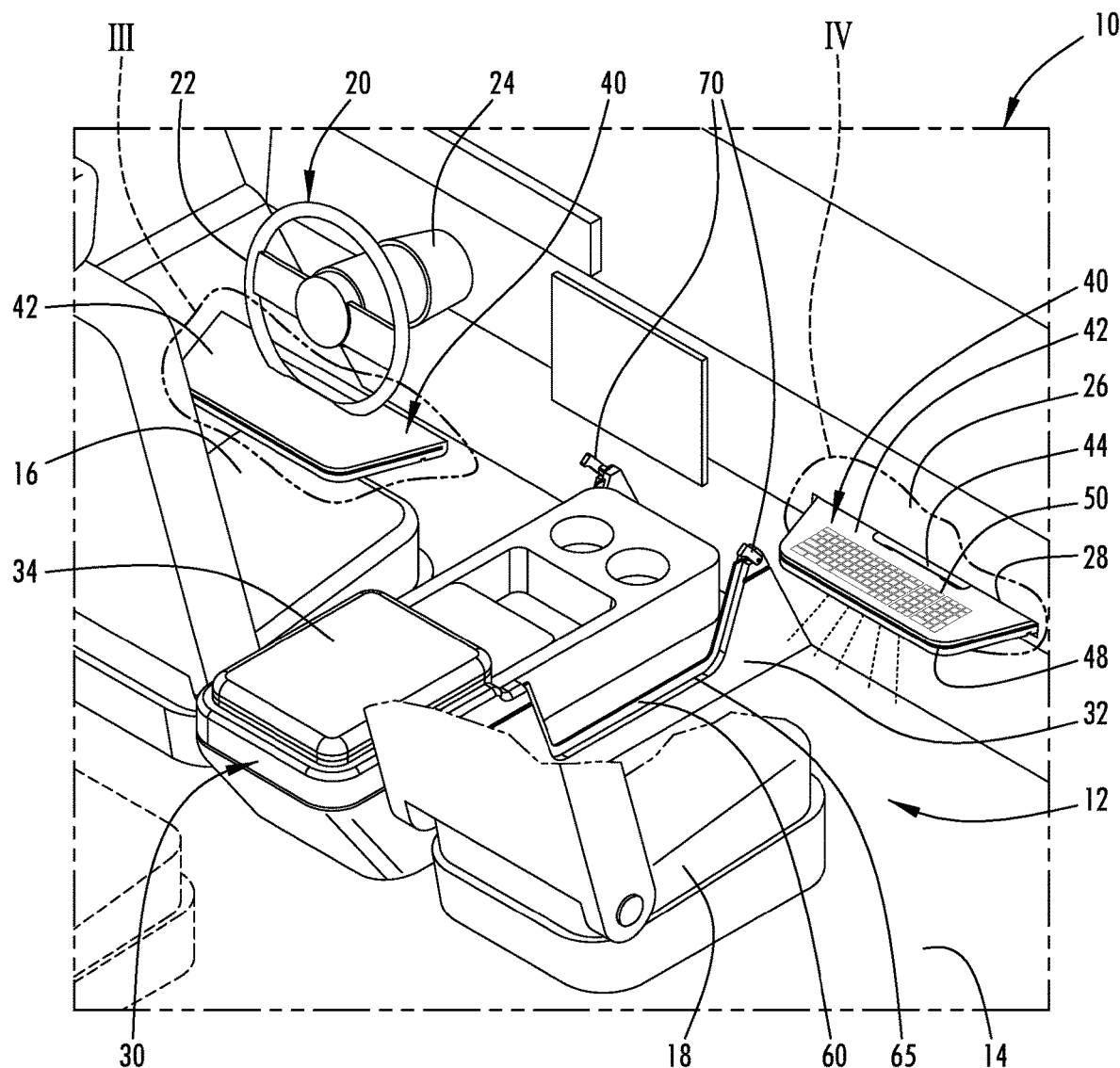
FIG. 2 is a rear perspective view of the cabin interior further illustrating the pair of trays in deployed positions, according to one example.

Referring to FIGS. 1 and 2, a wheeled automotive or motor vehicle is generally illustrated configured with passenger seating for transporting one or more passengers including a driver and front passenger of the vehicle 10 and for further transporting one or more items onboard the vehicle 10. The motor vehicle 10 has a vehicle body that generally defines a cabin interior 12. The cabin interior 12 may contain various features and trim components. The cabin interior 12 is shown having an arrangement of passenger seats including a first seat assembly 16 configured to seat a driver and a second seat assembly 18 configured to seat a passenger. The first and second seat assemblies 16 and 18 may be configured as captain's seats separated by a center console 30, for example. The motor vehicle 10 may also include additional seating, such as second, third, and more rows of seating as is common for a typical large SUV, van, or bus. It should be appreciated that the motor vehicle 10 may be a motor vehicle, such as a wheeled car, truck, SUV, van, or bus, for example, or an airplane, train, boat, or other vehicle capable of transporting one or more passengers and items.

The motor vehicle 10 is illustrated having the first seat assembly 16 positioned on the driver (e.g., left) side and vehicle rearward of a steering wheel assembly 20 and configured for seating a driver of the vehicle 10. The first and second seat assemblies 16 and 18 may each include a seat base and a seat back and may be adjusted to move in multiple directions. The second seat assembly 18 is shown positioned on the opposite passenger (e.g., right) side and vehicle rearward of a dashboard 26. The dashboard 26 has a horizontal slot 28 formed therein on the vehicle rearward side with an opening generally facing the second seat assembly 18. The horizontal slot 28 generally is open on the vehicle rearward side of the dashboard 26 and configured to receive a tray which is configured for use by a passenger seated in the second seat assembly 18.

The steering wheel assembly 20 generally includes a steering column 24, which extends vehicle rearward from of the dashboard 26. The steering wheel assembly 20 also includes a circular steering wheel 22 configured to be grasped by hands of a driver seated on the first seat assembly 16 and to be rotated clockwise and counterclockwise to steer the vehicle, such as to turn the steered vehicle wheels. As such, the steering wheel 22 extends to a position generally forward of and engageable by the driver of the motor vehicle 10 who is seated on the first seat assembly 16.

The center console 30 is generally shown supported on or above a floor 14 of the motor vehicle 10 and positioned between the first seat assembly 16 and the second seat assembly 18. The center console 30 includes a housing 32 that may generally define a storage compartment having a top access opening that is covered by an armrest/lid 34. The housing 32 is formed with side walls on opposite lateral sides and the first and rear sides. Each of the opposite lateral sidewalls of the housing 32 includes a tray storage region 65 configured to receive and stow a tray which, in the stowed position, defines a further portion of the housing wall and, in a deployed position, is useable as a tray.

As seen in FIG. 1, a pair of trays 40 are disposed within respective opposite lateral sidewalls within the tray storage regions 65 when located in the stowed tray position. As such, each tray 40 defines a further portion of the housing wall to further define the center console housing 32. Each tray 40 is removably connected to the housing 32 by way of a connector assembly such as a locking cam latch 70 that allows for retainment and removal of the tray 40 from the tray storage region 65. Each tray storage region 65 generally includes a rear-angled wall, a bottom wall, and a forward-angled wall. Each tray storage region 65 includes a rib 60 extending along the tray storage region 65 which extends inward along a central axis and is generally configured to be sized and configured to be shaped to be matingly received within a slot 48 defined in the edge of the tray 40.

Referring to FIG. 2, the pair of trays 40 are shown in deployed positions configurable for use as a tray such as to hold one or more items on the top surface, according to one example. Each tray 40 has an elongated opening 44 configured to serve as a handle and configured in a size and shape to receive the steering wheel 22 of the steering wheel assembly 20 such that the tray 40 is supported on the steering wheel 22 of the steering wheel assembly 20 in a deployed position. One tray 40 is shown in FIG. 2 supported on the lower portion of the steering wheel 20, and the other tray 40 is shown inserted and supported in the slot 28 in the dashboard 26 of the motor vehicle 10.

Figure 3:
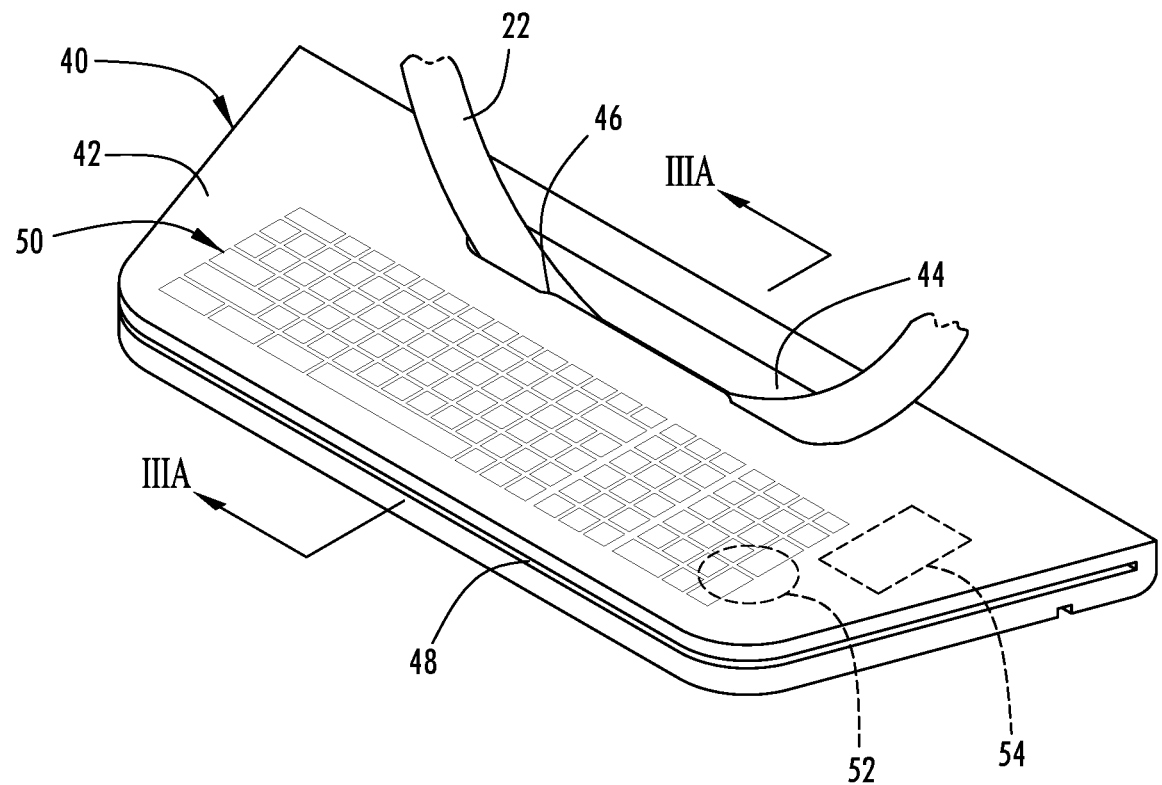
FIG. 3 is a rear perspective view of a tray operatively coupled to a steering wheel in a deployed position.
Figure 3A:
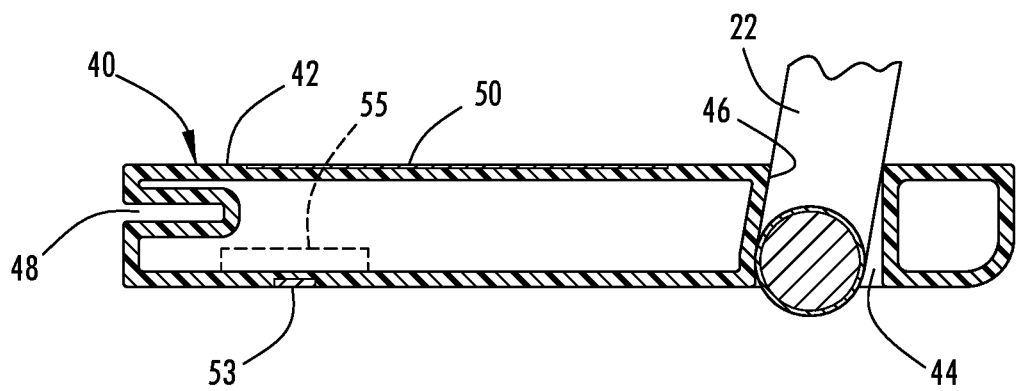
FIG. 3A is a cross-sectional view taken through line IIIA-IIIA of FIG. 3.

As shown in FIGS. 3 and 3A, the opening 44 formed in tray 40 generally has an oblong shape which appears as a rectangle with rounded corners and has a bulge 46 generally in the middle region between left and right lateral sides closer to one side, seen as the vehicle forward side, to help engage and leverage the steering wheel 22 such that the load of the tray 40 and any load on the tray 40 on the opposite (vehicle rearview) side creates a torque to maintain the positioning of the tray 40 on the steering wheel 22. It should be appreciated that the tray 40 may be installed on the lower portion of the steering wheel 22 by positioning the tray 40 below the steering wheel 22 and raising it with force and is configured to be held in position due to the weight of the tray 40 creating torque and engaging the steering wheel 22. It should be appreciated that the tray 40 may be installed on the bottom or top of the steering wheel 22 for use in motor vehicle 10 that is stopped and locked out in park and not moving, for example as a worksurface.

The tray 40 is further illustrated having a capacitive keypad 50 provided on the top surface 42 that is configured to enable a user to interface by entering inputs with a display screen and/or computer processing device. The capacitive keypad 50 may be powered by a power supply, such as rechargeable batteries located in the tray 40, and the keypad inputs may be communicated via wireless communication with the display, a vehicle controller, or one or more other processing devices. As such, the capacitive keypad 50 has wireless communication circuitry so that a user may provide user inputs via the capacitive keypad 50 to other communication devices. The capacitive keypad 50 may include capacitive sensors, according to one embodiment. According to other embodiments, the capacitive keypad 50 may include mechanical pushbutton switches.

In addition, the top surface 42 of the tray 40 may include a charging pad 54 that may be used to charge a portable device, such as a phone or a tablet, for example. The charging pad 54 may include inductive charging circuitry that may include one or more inductive coils that supply power from the power source, such as the rechargeable battery and electrically coupled with one or more inductive coils in an electrically powered device having one or more rechargeable batteries to be charged. In addition, a heating surface 52 may be provided on the top surface 42 of the tray 40 to provide thermal energy to heat a drink container or other object, for example. As such, the tray 40 may include the power source in the form of one or more rechargeable batteries that may be recharged via inductive charging or via wired connection with one or more contacts when stowed in the stowed position on the center console 30. The tray 40 has a lighting device 53 on the bottom side to illuminate the area below the tray 40. In addition, the tray has electrical circuitry 55 which may include the one or more batteries and charging circuitry such as contacts or wireless inductive charging circuitry.

Figure 4:
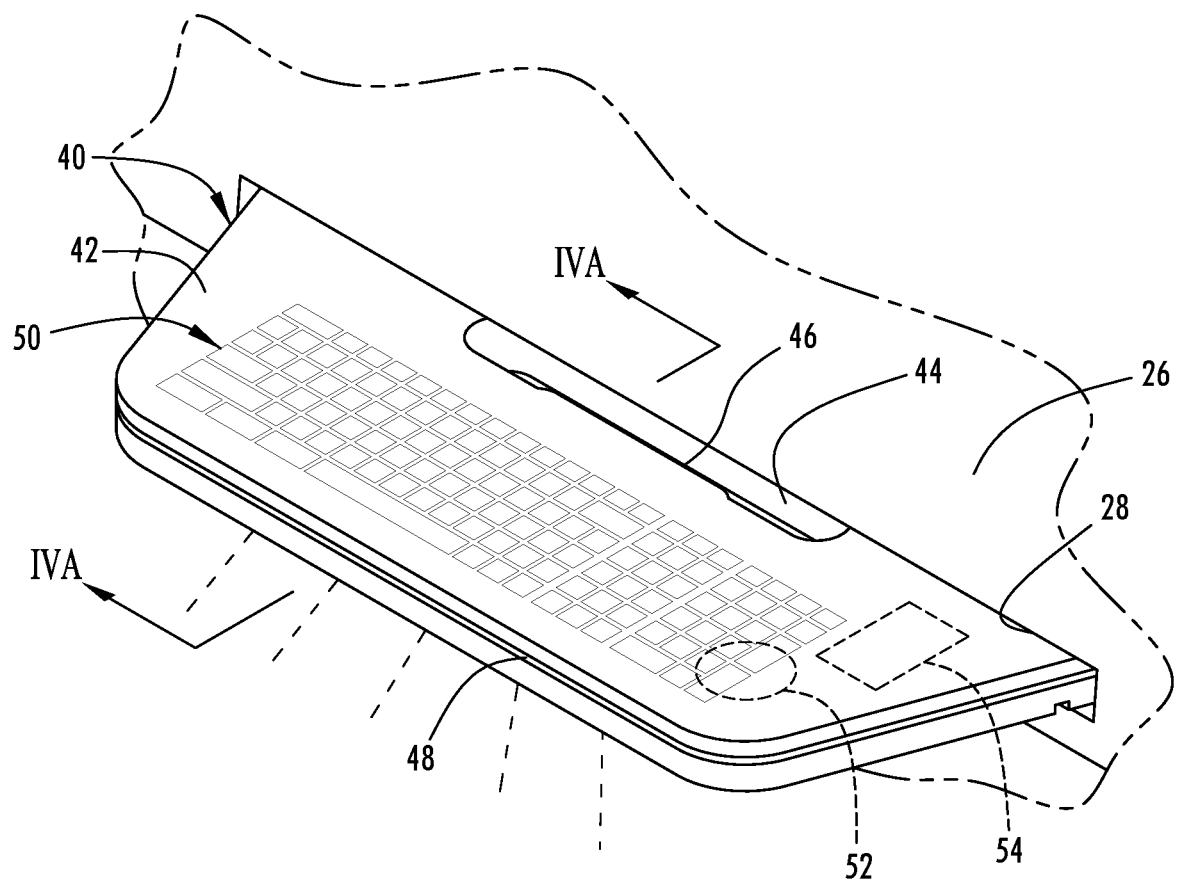
FIG. 4 is a rear perspective view of a tray inserted in a slot in a dashboard in a deployed position, according to another example.
Figure 4A:
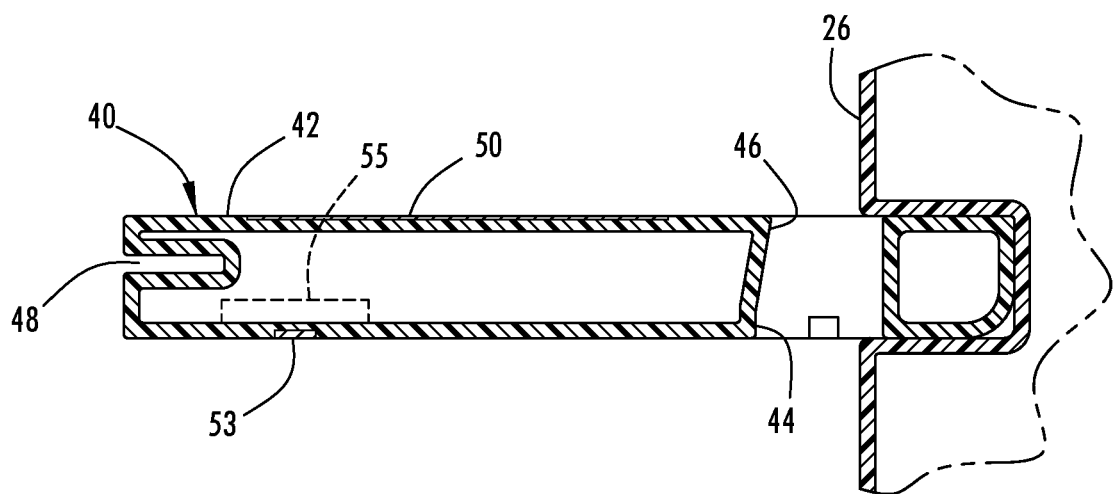
FIG. 4A is a cross-sectional view taken through line IVA-IVA of FIG. 4.

The tray 40 is shown in FIGS. 2 and 4 located within slot 28 in the dashboard 26 generally in a deployed position in front of the second seat assembly 18. The tray 40 may be inserted within slot 28 and slid vehicle forward to a locking position. As such, the tray 40 extends vehicle rearward from the slot 28 and dashboard 26 in a position proximate to a passenger seated in the second seat assembly 18 to allow for the passenger seated in the second seat assembly 18 to interface with or use the tray 40.

While the tray 40 is shown in deployed positions on the steering wheel 22 and in slot 28 in the dashboard 26, it should be appreciated that the tray 40 may be positioned in other deployed positions on the vehicle 10. For example, the tray 40 may be deployed in a slot in the back side of a seat and/or on a door for use by passengers in a rear row of seating.

It should be appreciated that the opening 44 in tray 40 is shaped and sized to also serve as a handle to allow for the transportation of the tray 40 and to position the tray 40 in either of the deployed positions on the steering wheel 22 or in the slot 28 or the stowed positions within the center console 30.

Figure 5:
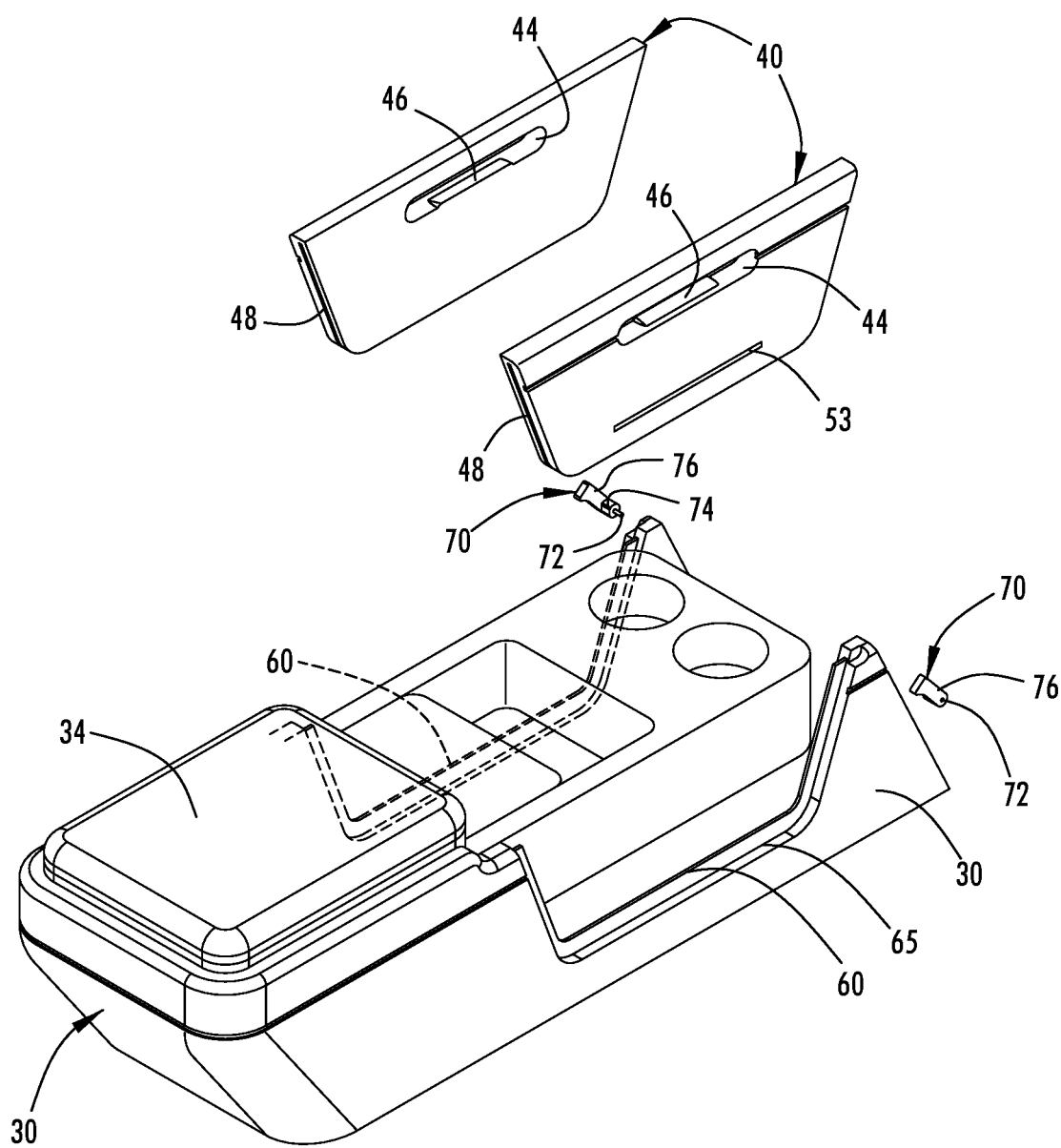
FIG. 5 is an exploded view of the center console with the pair of trays removed from the sidewalls of the center console.
Figure 6:
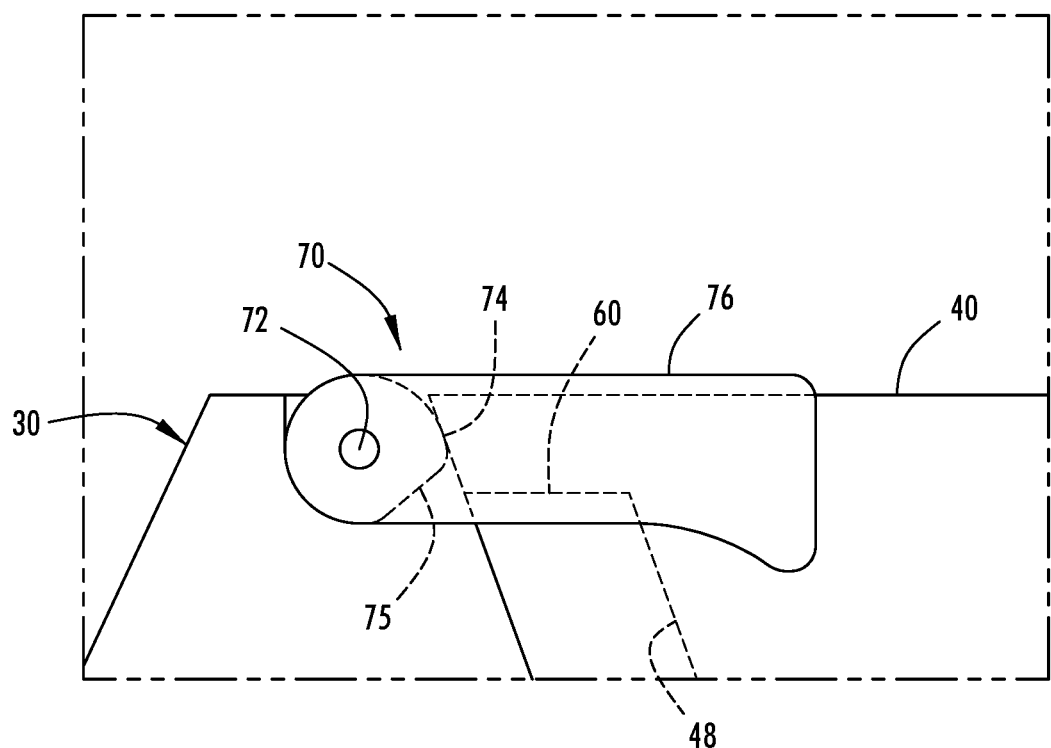
FIG. 6 is a perspective view of the camlock latch used to latch a tray onto the center console in the stowed position, according to one example.
Figure 6A:
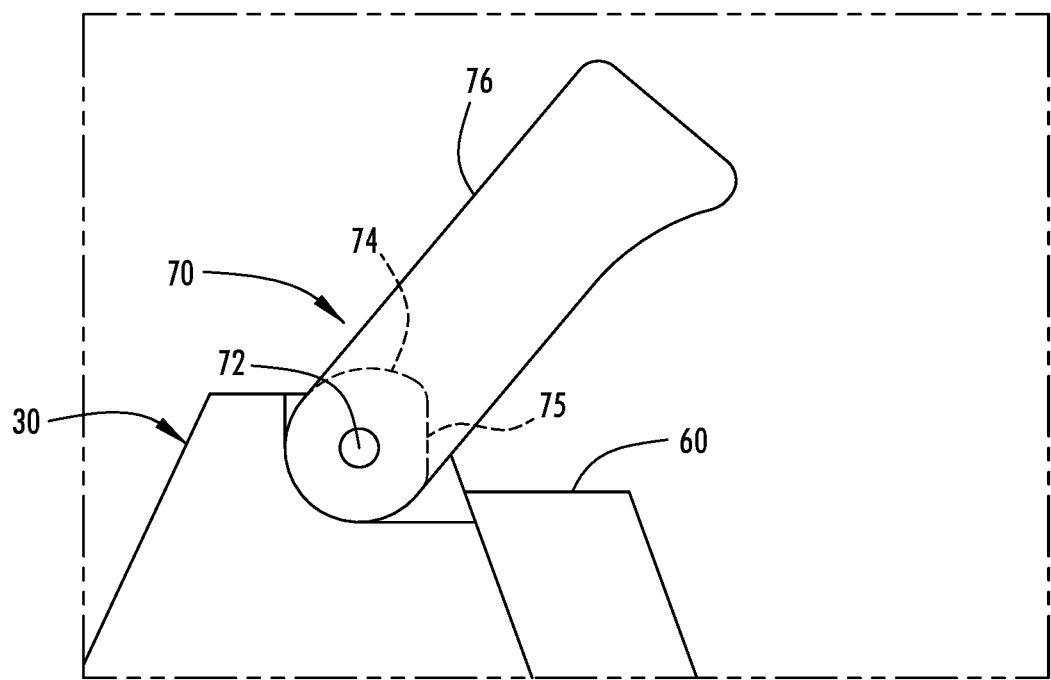
FIG. 6A is a perspective view of the camlock latch of FIG. 6 in the unlocked position.

Referring to FIGS. 5 and 6, each of the trays 40 may be inserted within the tray storage regions 65 by positioning the tray 40 within a tray storage region 65 such that the slots 48 on the tray 40 matingly engages and receives the rib 60 defined along the front, rear, and bottom edge of the tray storage regions 65. With a tray 40 positioned within the tray storage region 65, the connector assembly in the form of a cam latch 70 can be actuated by a user by rotation of a cam to apply a force to force the tray 40 into a locked position. The cam latch 70 is further shown in FIG. 6 in a locked position and in FIG. 6A in an unlocked position. The cam latch 70 includes a cam 74 having a flat surface 75 on one portion. The cam 74 rotates about a pivot pin 72 when a lever 76 is rotated by the user. In the locked position shown in FIG. 6, the flat surface 75 of cam 74 is facing the downward surface. When a tray 40 is desired to be used in a deployed position, the cam latch 70 may be rotated to an unlatched position and the user may simply apply force to lift the tray 40 out of the tray storage region 65 and insert the tray 40 into a deployed position.

Accordingly, the motor vehicle 10 is advantageously provided with one or more trays 40 that may be stored on a wall of the center console 30 in a stowed position and may be deployed to a deployed tray position, such as on a steering wheel 22 or within a dashboard 26 to provide a tray surface in the deployed position.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:
   a steering wheel assembly having a steering wheel;
   a console having a housing with a wall configured with a tray storage region; and
   a tray configured to be stored in the tray storage region in the console in a stowed position, wherein the tray is configured to be operatively coupled to the steering wheel in a deployed position, wherein the console further comprises a connector assembly for connecting the tray to the tray storage region in the stowed position, and wherein the connector assembly comprises a cam latch for latching the tray in a fixed position onto the tray storage region.

2. The vehicle of claim 1, wherein the tray has a first edge that matingly engages with a second edge of the tray storage region.

3. The vehicle of claim 2, wherein the first edge has a slot and the second edge has a rib that is matingly engageable in the slot.

4. The vehicle of claim 3, wherein the tray has angled first and second sides that fit within angled first and second sides of the tray storage region.

5. The vehicle of claim 1, wherein the tray comprises an opening configured to receive a portion of the steering wheel.

6. The vehicle of claim 5, wherein the opening has an oblong shape.

7. The vehicle of claim 5, wherein the opening includes a bulge portion between ends of a slot, wherein the bulge portion allows the tray to engage a lower portion of the steering wheel.

8. The vehicle of claim 1, wherein the tray forms a portion of a wall of the console in the stowed position.

9. The vehicle of claim 1, wherein the console is a center console positioned between two seating assemblies.

10. The vehicle of claim 1, wherein the center console includes a first tray storage region and a second tray storage region on opposite walls, and wherein the vehicle includes a first tray configured to fit within the first tray storage region and a second tray configured to fit within the second tray storage region in the stowed position.

11. A method of providing a tray on a steering wheel in a motor vehicle, the method comprising:
    providing a console on the vehicle having a sidewall provided by a tray connected to a tray storage region;
    removing the tray from the tray storage region in the sidewall of the console;
    placing the tray on a portion of the steering wheel such that a portion of the steering wheel extends through an opening formed in the tray; and
    unlatching the tray from the tray storage region by rotating a cam latch to an unlatched position.

12. The method of claim 11, wherein the step of inserting the tray on the steering wheel comprises inserting the tray on a lower portion of the steering wheel.

13. The method of claim 11, wherein the tray includes a first edge configured to matingly engage a second edge of the tray storage region.

14. The method of claim 11 further comprising inserting the tray in a slot in a dashboard forward of a passenger seat in the vehicle.

15. The method of claim 11 further comprising the step of reinserting the tray in the tray storage region and fixedly latching the tray with the cam latch.

16. The method of claim 11, wherein the console comprises a center console having first and second tray storage regions configured to receive first and second trays.

17. A method of providing a tray on a steering wheel in a motor vehicle, the method comprising:
    providing a console on the vehicle having a sidewall provided by a tray connected to a tray storage region;
    removing the tray from the tray storage region in the sidewall of the console; and
    placing the tray on a portion of the steering wheel such that a portion of the steering wheel extends through an opening formed in the tray, wherein the tray includes a first edge configured to matingly engage a second edge of the tray storage region, and wherein the first edge has a slot and the second edge has a rib that is matingly engageable in the slot.

* * * * *